US010169850B1

United States Patent
Carey et al.

(10) Patent No.: US 10,169,850 B1
(45) Date of Patent: *Jan. 1, 2019

(54) FILTERING OF REAL-TIME VISUAL DATA TRANSMITTED TO A REMOTE RECIPIENT

(71) Applicant: International Business Machines Corporation, Armonk, NY (US)

(72) Inventors: James E. Carey, Rochester, MN (US); Jim C. Chen, Rochester, MN (US); Rafal P. Konik, Oronoco, MN (US); Ryan L. Rossiter, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/726,360

(22) Filed: Oct. 5, 2017

(51) Int. Cl.
| | |
|---|---|
| H04N 7/14 | (2006.01) |
| G06T 5/00 | (2006.01) |
| G06T 7/11 | (2017.01) |
| H04L 29/06 | (2006.01) |

(52) U.S. Cl.
CPC .............. G06T 5/002 (2013.01); G06T 7/11 (2017.01); H04L 65/4069 (2013.01); H04N 7/147 (2013.01)

(58) Field of Classification Search
CPC ............. H04N 7/14; H04N 7/142; H04N 7/15
USPC ........................... 348/14.01–14.16, 152, 143
See application file for complete search history.

(56) References Cited

U.S. PATENT DOCUMENTS

| | | | |
|---|---|---|---|
| 6,509,926 B1 * | 1/2003 | Mills | G08B 13/1968 348/143 |
| 8,161,397 B2 | 4/2012 | Kalasapur et al. | |
| 8,687,021 B2 | 4/2014 | Bathiche et al. | |
| 8,994,672 B2 | 3/2015 | Thorn et al. | |
| 9,122,053 B2 | 9/2015 | Geisner et al. | |
| 9,224,322 B2 | 12/2015 | Martellaro et al. | |
| 9,335,919 B2 | 5/2016 | Wong | |
| 9,418,481 B2 | 8/2016 | Price | |
| 9,424,239 B2 | 8/2016 | Dunn et al. | |
| 2012/0038669 A1 | 2/2012 | Lee et al. | |
| 2012/0167014 A1 | 6/2012 | Joo et al. | |

(Continued)

OTHER PUBLICATIONS

Ajanki, A. et al., "An augmented reality interface to contextual information", Virtual Reality (2011) 15:161-173, Springer Verlag London Limited, published online Dec. 16, 2010.

(Continued)

*Primary Examiner* — Melur Ramakrishnaiah
(74) *Attorney, Agent, or Firm* — Roy W. Truelson

(57) ABSTRACT

A remote visual experience application which transmits real-time video remotely includes a filter which obscures one or more previously identified regions in space when the regions come within the camera's field of vision. The application may be a shared visual experience application, in which the camera is mounted to a wearable appliance of a local user. The application may include a function for mapping regions of a space in which the application will be used, and defining different levels of remote access for different regions of the space. A space map may be generated before or during transmission of video to a remote user. Exemplary embodiments include a virtual vendor house call application or a game. The application may further include an audio filter for filtering an audio signal.

14 Claims, 9 Drawing Sheets

(56) References Cited

U.S. PATENT DOCUMENTS

| | | | |
|---|---|---|---|
| 2013/0083063 A1* | 4/2013 | Geisner | G06F 3/011 |
| | | | 345/633 |
| 2014/0152815 A1* | 6/2014 | Huang | H04N 21/4542 |
| | | | 348/143 |
| 2014/0222462 A1 | 8/2014 | Shakil et al. | |
| 2014/0362163 A1* | 12/2014 | Winterstein | H04N 7/15 |
| | | | 348/14.07 |
| 2016/0027215 A1 | 1/2016 | Burns et al. | |
| 2016/0260255 A1 | 9/2016 | Bean et al. | |
| 2017/0238805 A1* | 8/2017 | Addison | A61B 5/0077 |

OTHER PUBLICATIONS

Burgett, G., "You Can Now Censor Parts of Video Directly in Youtube's Creator Studio", published online at: http://www.diyphotography.net/you-can-now-censor-parts-of-video-directly-in-youtubes-creator-studio/ (Feb. 27, 2016).

Julier, S., et al., "Information Filtering for Mobile Augmented Reality", IEEE International Symposium on Augmented Reality 2000, Munich, Germany, pp. 3-11 (Oct. 2000).

Oh, S., et al., "CAMAR: Context-aware Mobile Augmented Reality in Smart Space", Proceedings of International Workshop on Ubiquitous Virtual Reality, 15-18 (2009).

O'Brolchain, F., et al., "The Convergence of Virtual Reality and Social Networks—Threats to Privacy and Autonomy", Science & Engineering Ethics, vol. 22, p. 1-29 (Feb. 2016).

International Business Machines Corporation, "List of IBM Patents or Patent Applications Treated as Related", filed in USPTO in present application herewith.

\* cited by examiner

FILTERING OF REAL-TIME VISUAL DATA TRANSMITTED TO A REMOTE RECIPIENT

FIELD

This disclosure generally relates to digital data processing, and in particular to digital data systems for managing transmission or streaming of visual data for display to a remote recipient.

BACKGROUND

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users. At the same time, the cost of computing resources has consistently declined, so that information which was too expensive to gather, store and process a few years ago, is no economically feasible to manipulate via computer. The reduced cost of information processing drives increasing productivity in a snowballing effect, because product designs, manufacturing processes, resource scheduling, administrative chores, and many other tasks, are made more efficient.

Among the applications of digital data processing technology is the capture, storage, transmission and other processing of images, both in still and motion video forms. A large variety of applications now process images is some form or another. So large is the demand for image processing that standard computer systems are now equipped with special processors and other hardware for that purpose, and a substantial amount of digital data storage is devoted to the storage of still and motion video images.

A variety of applications have emerged which transmit video data in real time for display to a remote recipient. An example is a teleconferencing application, in which a video camera is typically mounted in a fixed position in a designated room, and the video image of the space within the camera's field of vision is transmitted to a remote location for display to one or more conference participants. Early teleconferencing and similar applications required expensive hardware and software, and were accordingly limited in number and usage. As the costs of cameras, processors, transmission bandwidth, and associated resources has declined, the number and availability of applications involving video transmission have dramatically increased.

A more recent type of application shares a visual experience of a local user with a remote user in real time. The camera is physically fitted to the local user, as for example, by being mounted on a wearable appliance. As the local user changes his field of vision by moving about a structure, turning his head, and so forth, the camera automatically follows these movements so that the camera's field of vision approximates the local user's. Video captured by the camera is transmitted to the remote user, allowing the remote user to see what the local user sees. For example, it has been suggested that such an application could be used for diagnosing or repairing equipment remotely, where the remote user (an expert) provides advice, analysis, and direction to the local user (such as a homeowner).

In a further example, a rapidly growing virtual reality industry provides virtual reality applications and virtual reality enabling hardware devices for entertainment or business. Among the hardware devices are virtual reality headsets which may include integrated camera, microphone, and display. The display may be projected on a transparent screen over the user's eyes, allowing the user to see through the screen and see images projected on the display at the same time. Alternatively, the displayed images may be projected or displayed in a manner which obscures the users field of vision, allowing the user to see only what is provided by the display. A virtual reality application may allow a remote user to be immersed in the experience of the local user by transmitting video as seen by the local user to the to the remote user in real time. Such a virtual reality environment could be used for entertainment, or any of various virtual vendor house call applications, or otherwise.

SUMMARY

A remote visual experience application which transmits video data captured by a movable camera in real time to a remote recipient includes a filter which obscures one or more previously identified regions in space when the regions come within the field of vision of the camera.

In one or more embodiments, not necessarily the only embodiments of the present invention, the remote visual experience application is a shared visual experience application, in which the camera is mounted to a wearable appliance of a local user. As the local user changes the orientation and/or location of the camera, the application automatically identifies regions which should not be displayed to the remote recipient sharing the visual experience of the local user, and causes those regions to be obscured in the video stream transmitted to the remote recipient.

In one or more embodiments, not necessarily the only embodiments of the present invention, the remote visual experience application is intended for use in a user's home and the filter protects private regions or objects within the home from display to third parties.

In one or more embodiments, not necessarily the only embodiments of the present invention, the remote visual experience application further includes a mapping utility by which a user maps the various regions of a space in which the application will be used, such as a space within or about a home, a business, or other space, and defines different levels of remote access for different regions of the space.

In one or more embodiments, not necessarily the only embodiments of the present invention, a user defines one or more default remote access attributes for the space, and defines one or more exceptions to the default for one or more identified regions of the space. The exceptions may broaden or narrow the ability of a remote user to view video within the excepted regions. For example, a user may specify that, for at least one class of remote viewer, the entire space is to be obscured from view, except for one or more defined regions.

The space may be mapped before the remote visual experience application executes by transmitting video to the remote user, or concurrently with transmission of video to the remote user. Mapping may be performed by walking through the various regions of the space with the camera, directional sensing apparatus, position sensing apparatus, and/or distance measuring apparatus activated. The application may automatically generate a map of the space using sensor data during the walk through. For each of multiple regions, the user may designate a corresponding level of privacy, by voice command, key input, hand gestures, or the like.

In an exemplary embodiment, the remote visual experience application is a virtual vendor house call application, in which a local user within a home (e.g., homeowner or renter) provides video to and obtains assistance from a remote user. The purpose of the application is to enable the local user to obtain services of the remote user without requiring actual presence of the remote user. The remote user may an expert who is in the business of providing the services, or may be a friend, family member or the like, who has some limited expertise. By way of illustration and not limitation, the services provided may involve repair or improvement of the home or contents (e.g., plumbing, electrical, appliance repair, carpentry, etc.), or may involve any of numerous other services, such as medical/nursing services including emergency services, educational services, horticultural services, veterinary services or other pet care, athletic training, culinary services, and so forth. In an embodiment, the local user wears an appliance mounting the camera, and allowing the remove user to see what is seen by the local user. The remote user may direct the local user to perform certain operations, to look in certain directions, etc. in order to provide advice and assistance. In doing so, the local user may, in the absence of a video filtering mechanism as disclosed herein, expose to the remote user information of a private or sensitive nature which is unrelated to or not needed to perform the service requested of the remote user.

In an alternative exemplary embodiment, a virtual vendor house call is not limited to local users who are homeowners or home occupants, but could be used to provide any of various services to business entities. These could include some of the same types of services used by homeowners (plumbing, electrical, horticultural, etc.), or could be other services generally used only by businesses, such as process monitoring or analysis, employee training or certification, compliance auditing for applicable laws, labor contracts, and so forth.

In another exemplary embodiment, the remote visual experience application is a game or other entertainment which may be played by children or adults sharing video information, in which the participants may roam freely through the space and, in the absence of a video filtering mechanism as disclosed herein, inadvertently capture and transmit video images of a sensitive or private nature.

In an alternative embodiment, a filtering apparatus may also filter an audio portion of a video signal sent to a remote user.

By selectively filtering regions of a space according to pre-specified directions, the risk of inadvertent or deliberately elicited disclosure of private or sensitive information when providing video to remote viewers is substantially reduced, thereby enhancing user privacy. Furthermore, such privacy enhancements may give any of various virtual reality or other applications providing remote video a wider acceptance and usage, thereby improving efficiencies of providing and receiving services, reducing costs, or simply enhancing an entertainment experience.

The details of the present invention, both as to its structure and operation, can best be understood in reference to the accompanying drawings, in which like reference numerals refer to like parts, and in which:

DETAILED DESCRIPTION

Remote Visual Experience Environment

Figure 1:
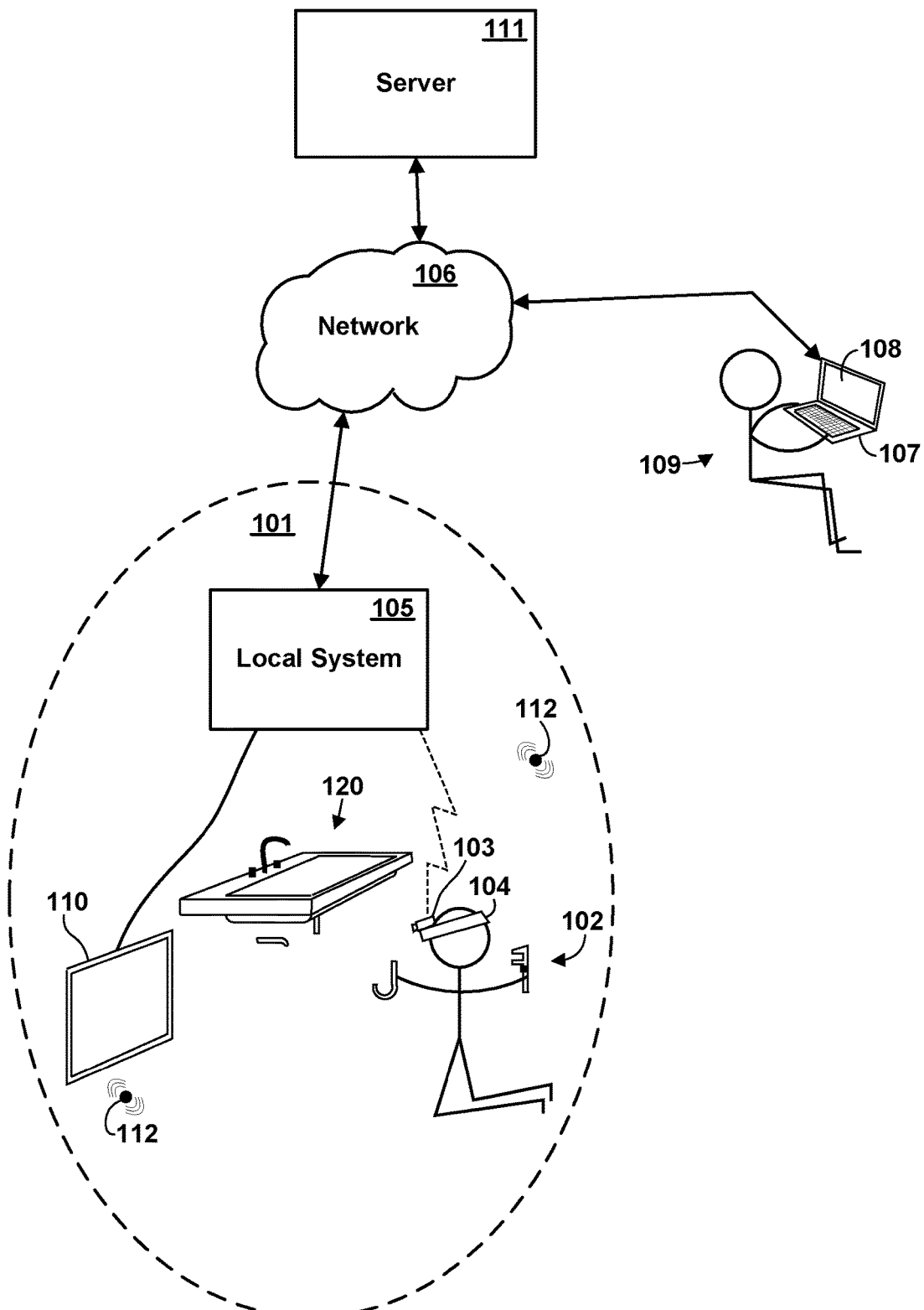
FIG. 1 illustrates a virtual vendor house call environment for executing a remote visual experience application, according to various embodiments.

Referring to the Drawing, wherein like numbers denote like parts throughout the several views, FIG. 1 is a high-level illustration of an exemplary virtual vendor house call environment in which an application executing on one or more computer systems supports a remote visual experience, according to one or more embodiments. Referring to FIG. 1, a local environment 101 exists in which a local user 102 can move about a space and perceive objects within that space. In an exemplary embodiment, the local environment is the space within a user's home, although the local environment could be some other space, such as a space within a business location. Local user 102 directs a movable video camera 103 to one or more objects of interest 120 in the local user's environment. In the example of FIG. 1, the objects of interest include a sink and related plumbing components, it being understood that object of interest could include a wide range of objects in the local environment. Video data generated by camera 103 is transmitted to local computer system 105 supporting a remote visual experience application, which in this instance is a virtual vendor house call application, which further transmits the video data over network 106 to remote computer system 107. Remote system 107 includes a display 108, which presents video images obtained from camera 103 to remote user 109.

In one or more embodiments, one or more reference markers 112 are positioned within the local environment to enable the application to determine the location and/or orientation of camera 103. In one or more alternative embodiments, the location and/or orientation of camera 103 is determined using alternative means which do not require reference markers.

In one or more embodiments, video camera 103 is part of a wearable apparatus 104 which mounts the camera in an orientation approximating the wearer's (i.e., the local user's) field of vision or direction of sight, and communicates with local system 105 via a wireless communications link. For example, video camera 103 may be part of a headgear apparatus worn on the head, and which follows the wearer's head movements to approximate the wearer's direction of sight. Such an apparatus may include sensors for detecting the location and orientation of the video camera. Such an apparatus could be a simple camera which is mounted to coincide with the orientation of the wearer's head. Alternatively, it might be any of various so-called virtual reality headsets which cover the wearer's eyes and in which the user's own vision is wholly or partially obscured or modified by computer generated data displayed to the wearer by the headset. For example, such a headset may completely obscure the wearer's line of sight, so that the wearer can only see images generated by the video camera (and thus the remote user and the local user see exactly the same images), or may superimpose computer generated images on what the wearer sees through a transparent screen, so that the user's vision is only partially blocked. Such a headset may include sensors for tracking eye movement of the wearer for greater accuracy.

Preferably, the remote visual experience application provides some level of two-way communication between the local user and the remote user. For example, a microphone may be mounted in headset 104 of the local user 102, and another microphone attached to remote system 107, enabling the local user 102 and the remote user 109 to be connected via a voice link, so that each can hear the other's voice and respond thereto. It is further possible that video images are sent in both directions, so that the local user can see video images from the remote user on a display 110 coupled to local system 105. For example, the remote user may be positioned in front of a fixed video camera for viewing by the local user. Two-way communication is generally useful in such an application so that the local user can receive commands or advice from the remote user and respond thereto. In particular, such commands may include requests to direct the user's field of vision to specified things, allowing the remote user to see any of various objects in the local user's environment.

Network 106 could be the Internet, or could be some other network or combination of networks. In one or more embodiments, a server system 111 coupled to network 106 supports the remote visual experience application. Server system 111 may, for example, maintain a web site through which multiple remote clients log on and establish connections for transmitting video and other data in real time as part of a remote visual experience application. In one or more embodiments, the video signal and/or other communications between local system 105 and remote system 108 are routed through server system 111. In one or more other embodiments, the server system acts as a proxy for verifying the identities of the parties and establishing one or more connections, and once established, video and/or other data may be transmitted directly between the local system and the remote system, without going through the server. Server system 111 is represented and described herein as a single computer system performing various functions, but it will be understood that the actions performed by a server system could alternatively be performed by multiple computer systems, and known in any of various cluster computing arrangements or cloud computing.

Although a single local user and a single remote user are shown and described herein for illustrative purposes, there could be multiple local and/or multiple remote users, which could share the respective local and remote systems, or which could use different respective systems. Additionally, multiple remote systems could be located in multiple different locations which are remote from one another.

Although an exemplary virtual vendor house call embodiment is illustrated in FIG. 1 in which a local user obtains assistance for home repair from a remote user, it will be understood that a remote visual experience application in accordance with the present invention is not necessarily limited to a virtual vendor house call embodiment, and could include a variety of alternative embodiments, which could involve the provision of other services by the remote user to the local user, or could involve gaming or other entertainment in which the various users operate in a peer-to-peer relationship and entertain one another, or could involve any of various other applications.

Computer System Hardware Components

Figure 2:
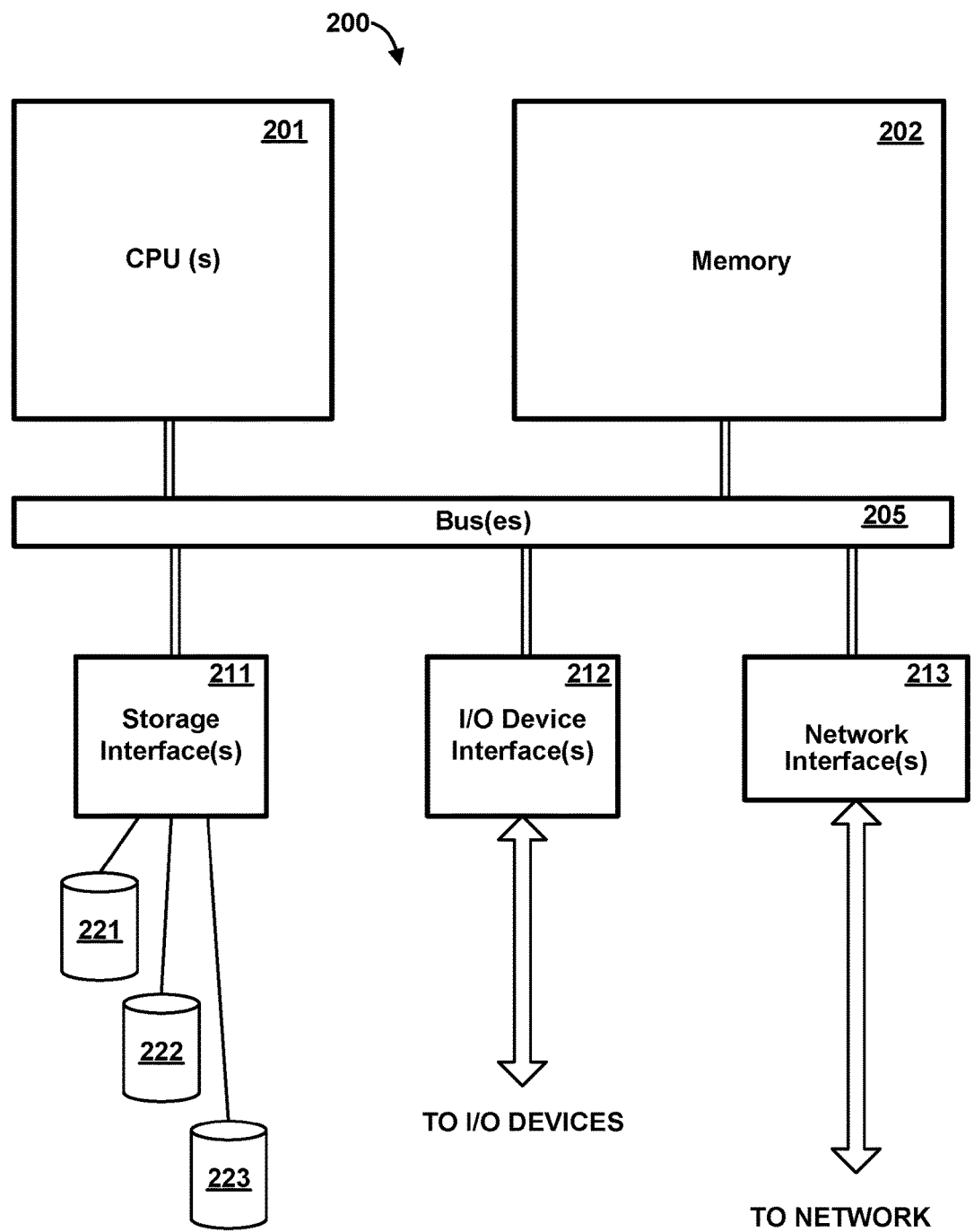
FIG. 2 is a high-level block diagram of the major hardware components of a representative general purpose computer system which could be used to perform the role of any of several functional elements, according to various embodiments.

FIG. 2 is a high-level block diagram of the major hardware components of a representative general purpose computer system 200. In one or more embodiments, local computer system 105, remote computer system 107, and server computer system 111 are each physically embodied as respective one or more general purpose computer systems, system 200 being a representation of any such general purpose computer system.

Computer system 200 includes one or more general-purpose programmable processors (CPU) 201 which execute instructions and process data from main memory 202. Main memory 202 is preferably a volatile random access memory comprising at least one, and typically multiple, semiconductor integrated circuit chip modules, using any of various memory technologies, in which data is loaded from storage or otherwise for processing by CPU(s) 201.

One or more communications buses 205 provide a data communication path for transferring data among CPU(s) 201, main memory 202 and various interface units 211, 212, 213, which may also be known as I/O processors (IOPs) or I/O adapters (IOAs). The interface units support communication with a variety of storage, I/O devices, and/or networks. For example, storage interface unit(s) 211 supports the attachment of one or more storage devices 221-223 providing non-volatile storage of data which can be loaded into memory as required. Such storage devices may include well-known rotating magnetic hard disk drive storage devices, solid state devices (SSD), removable memory cards, optical storage, flash memory, and so forth, and could further include network attached storage (NAS), devices attached via a storage area network (SAN), and/or arrays of disk drives and/or other storage devices configured to appear as a single large storage device to a host. Storage may further include cloud storage devices accessible via one or more networks. I/O device interface unit(s) 212 may support the attachment of any of various other types of I/O devices, such as user terminals, displays, keyboards or other input devices, printers, and so forth, it being understood that other or additional types of I/O devices could be used. Network interface adapter(s) 213 may support connections to one or more external networks for communication with one or more other digital devices, and specifically to network 106 for communication with devices represented in FIG. 1. Network adapter(s) 213 could support redundant connections to a single network, or could be coupled to separate networks, which may or may not be in communication with each other. Such external networks preferably include the Internet, and may include one or more intermediate networks, such as local area networks, through which communication with the Internet is effected.

It should be understood that FIG. 2 is intended to depict the representative major components of general purpose computer system 200 at a high level, that individual components may have greater complexity than represented in FIG. 2, that components other than or in addition to those shown in FIG. 2 may be present, that the number, type and configuration of such components may vary, and that a complex computer system will typically have more components than represented in FIG. 2. Several particular examples of such additional complexity or additional variations are disclosed herein, it being understood that these are by way of example only and are not necessarily the only such variations.

Although only a single CPU 201 is shown for illustrative purposes in FIG. 2, computer system 200 may contain multiple CPUs, as is known in the art. Although main memory 202 is shown in FIG. 2 as a single monolithic entity, memory 202 may in fact be distributed and/or hierarchical, as is known in the art. For example, memory may exist in multiple levels of caches, and these caches may be further divided by function, so that one cache holds instructions while another holds non-instruction data which is used by the processor or processors. Memory may further be distributed and associated with different CPUs or sets of CPUs, as is known in any of various so-called non-uniform memory access (NUMA) computer architectures. Although communications buses 205 are shown in FIG. 2 as a single entity, in fact communications among various system components is typically accomplished through a complex hierarchy of buses, interfaces, and so forth, in which higher-speed paths are used for communications between CPU(s) 201 and memory 202, and lower speed paths are used for communications with I/O interface units 211-213. Buses 205 may be arranged in any of various forms, such as point-to-point links in hierarchical, star or web configurations, multiple hierarchical buses, parallel and redundant paths, etc. For example, as is known in a NUMA architecture, communications paths are arranged on a nodal basis. Buses may use, e.g., an industry standard PCI bus, or any other appropriate bus technology. While multiple I/O interface units are shown which separate buses 205 from various communications paths running to the various I/O devices, it would alternatively be possible to connect some or all of the I/O devices directly to one or more system buses. Although FIG. 1 represents network 106 as a single entity, in one or more embodiments a separate network or storage bus may be present for communicating with one or more shared storage servers, and such communication may be driven by a dedicated one or more storage interface units 211 separate from general purpose network adapters 213.

Computer system 200 depicted in FIG. 2 may include multiple attached terminals, such as might be typical of a multi-user "mainframe" computer system. Where computer system 200 is a local computer system 105 for personal use in a user's residence, it would typically be a self-contained unit having a single display 110, such as a desktop or laptop personal computer. Where computer system 200 is a server computer system 111, it may contain only a limited number of terminals, or even a single terminal, e.g., for use as a maintenance interface by a system administrator or the like, or in some cases no terminal at all, administrative functions being performed remotely. Where computer system 200 is a remote computer system 107, its size and configuration may depend on the size of a business employing the remote user 109; for example, a small business such as an individual plumber or handyman may have a self-contained personal computer such as a desktop or laptop, while larger enterprises may use more complex systems involving multiple terminals or computers which may be connected via a local area network. It will be understood that the illustration of FIG. 2 is intended to represent the general hardware capabilities of a computer system, and that many variations in specific configuration are possible. Furthermore, while certain functions are described herein for illustrative purposes as embodied in a single computer system, some or all of these functions could alternatively be implemented using a distributed network of computer systems in communication with one another, in which different functions or steps described herein are performed on different computer systems.

Although local system 105, remote system 107, and server system 111 are represented in FIGS. 1-2 as complete independent systems, any or all of these entities may be implemented as corresponding logical partitions of one or more logically partitioned computer systems. For example, any of CPUs 201 may in fact be a corresponding portion of a processing resource capacity of a larger logically partitioned computer system which is allocated to the corresponding logical partition; and memory 202 may in fact be a corresponding portion of a memory capacity of a larger logically partitioned computer system which is allocated to the corresponding logical partition.

While various system components have been described and shown at a high level, it should be understood that a typical computer system contains many other components not shown, which are not essential to an understanding of the present invention.

Remote Visual Experience Application

Figure 3:
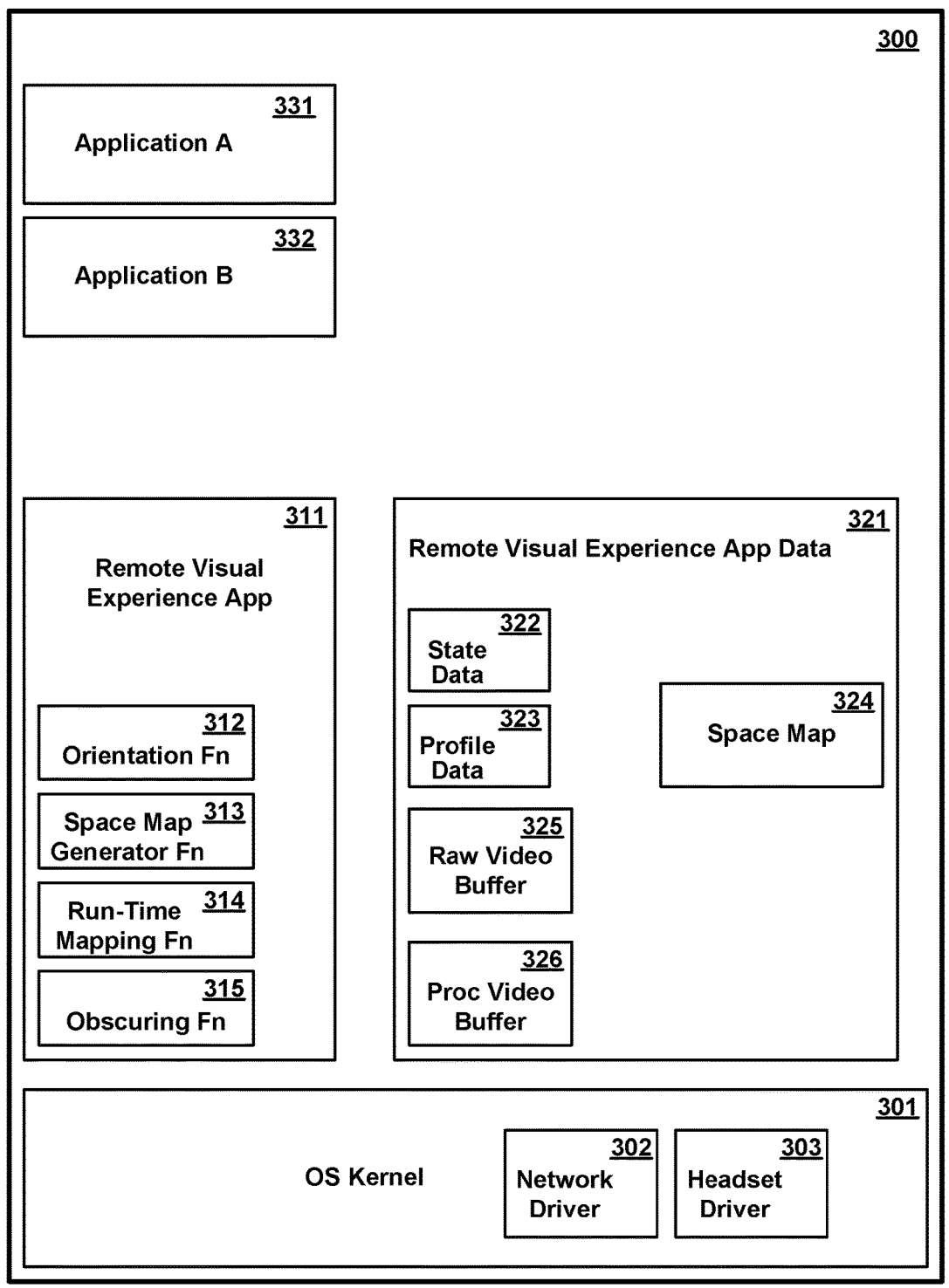
FIG. 3 is a conceptual illustration of certain software components in memory of a local computer system supporting a remote visual experience application, according to various embodiments.

FIG. 3 is a conceptual illustration showing in greater detail certain software components in memory 300 of a local computer system 105 supporting a remote visual experience application, and in particular supporting a virtual vendor house call application, according to various embodiments. As shown in FIG. 3, a representative local system memory includes an operating system kernel 301, a local copy or agent of a remote visual experience application 311, and certain shared remote visual experience application data 321.

Operating system kernel 301 is executable code and state data providing various low-level software functions, such as device interfaces, management of memory pages, management and dispatching of multiple tasks, common services for application programs, etc. as is well known in the art. In particular, OS kernel 301 preferably includes one or more network adapter drivers 302 for handling communications with one or more networks, including network 106, via network interface(s) 213. OS kernel further preferably includes one or more I/O device drivers for handling communication with video camera 103, microphone, position/orientation sensors, display, or other I/O devices; these are represented in FIG. 3 as headset driver 303, it being understood that there could be a single integrated headset having a single interface or multiple I/O devices having separate interfaces.

Remote visual experience application 311 comprises executable code for performing various functions in support of the remote visual experience application. For example, remote visual experience application performs any of various conventional functions such as receiving video and/or audio data from camera 103 or a local microphone, transmitting video/audio data to server system 111 and/or remote system 108, and displaying/presenting video/audio data received from remote system 108 to the user via display 110 or other I/O device. Remote visual experience application 311 generates and/or references various remote visual experience application data 321. In one or more embodiments, remote visual experience application 311 further includes an orientation function 312, a space map generator function 313, a run-time mapping function 314, and an obscuring function 315.

Orientation function 312 receives data from camera 103 and/or one or more local position sensors and determines a location and direction of focus of camera 103 from the sensor data. Space map generator function 313 generates a map of a local three-dimensional (3-D) space and stores a space map 324 in remote visual experience application data 321. Run-time mapping function 314 determines at run time which features in the space map are currently within the field of view of the camera and maps their locations to the video image. Obscuring function 315 uses pre-specified profile data 323 to identify regions in the 3-D space mapped by space map 324 which are to be obscured from viewing by a remote user, and modifies raw video data to obscure video images or portion thereof which encompass regions to be obscured.

In one or more embodiments, remote visual experience application data 321 includes state data 322, profile data 323, space map 324, raw video buffer 325, and processed video buffer 326. State data 322 includes data which specifies current program state, and in particular, includes data specifying a current location/orientation of camera 103. State data may include any of a variety of additional data needed for operating the remote visual experience application, such as identification of parties, status of connections, buffer pointers indicating what data has been sent and received, and so forth. Profile data may include a variety of data specifying preferred or default operating parameters of the remote visual experience application. In particular, in one or more embodiments profile data includes data specifying how video data of different areas of space defined by space map 324 are to be presented to different users. Space map 324 includes data identifying the boundaries and significant features of one or more spaces in which the remote visual experience application is intended to operate, i.e., of which it receives, processes and transmits video data. Raw video buffer 325 is a buffer in which video data received from camera 103 is temporarily stored pending processing by the remote visual experience application. Processed video buffer 326 is a buffer in which video data which has been processed for transmission to a remote user is temporarily stored pending transmission over network 106. Although video data is referred to herein as being transmitted and stored in real time, it will be understood that a small delay is necessary to process the video data and transmit it over the network.

Figure 4:
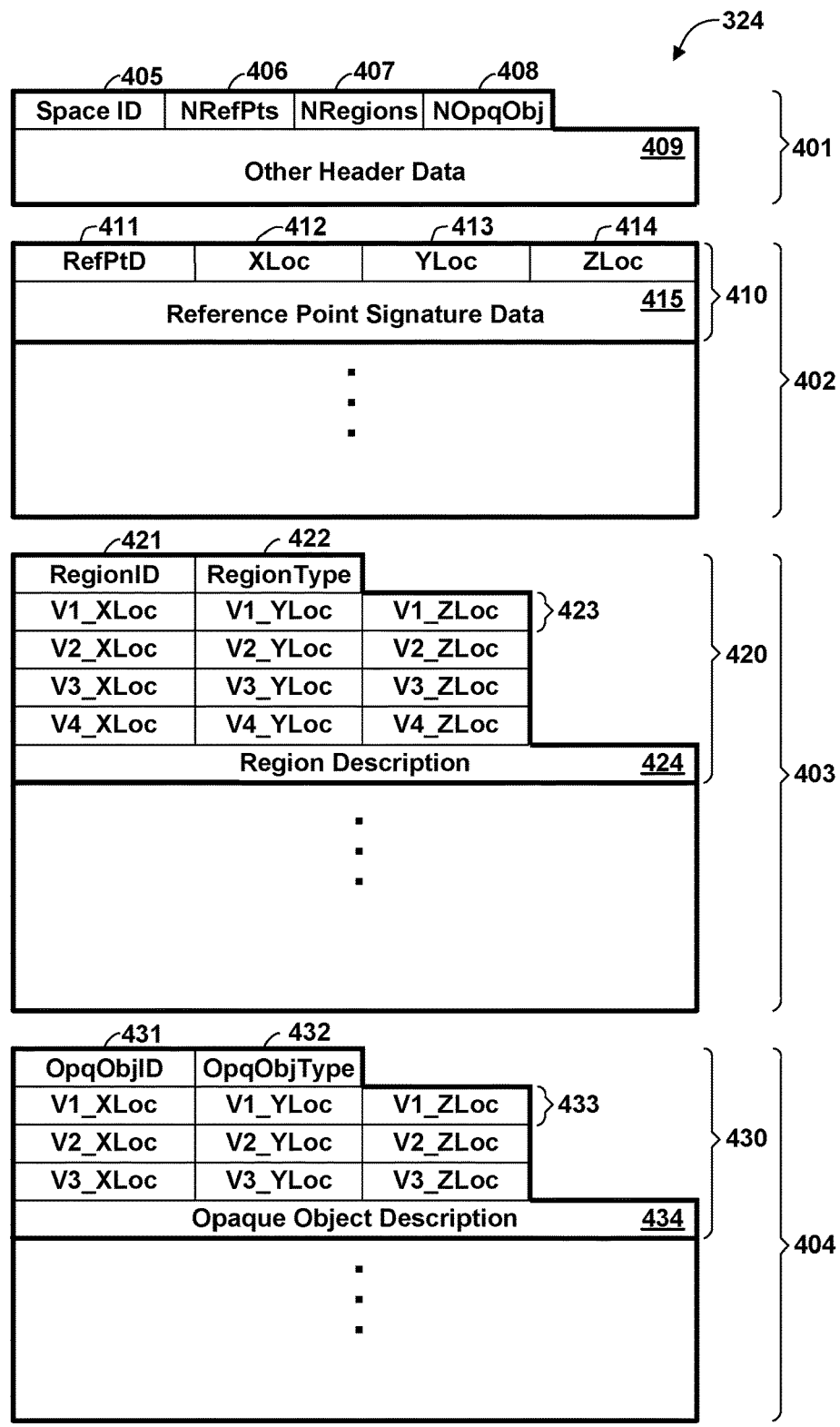
FIG. 4 is a conceptual representation of a space map data structure for supporting a remote visual experience application, according to various embodiments.

FIG. 4 is a conceptual representation of a space map data structure 324 supporting a remote visual experience application, and in particular supporting a virtual vendor house call application, according to various embodiments. Space map 324 identifies multiple regions in a 3-D space for which the remote visual experience application provides remote video, physical boundaries of the regions, reference points or features (such as markers 112) which assist orientation within the space, partitions or other significant opaque objects which may limit the field of view of a camera within the 3-D space, and so forth.

Referring to FIG. 4, space map 324 include a header portion 401, a reference point portion 402 containing one or more reference point records 410 each defining a respective reference point (of which one is illustrated in FIG. 4), a region portion 403 containing one or more region records 420 each defining a respective region within the space (of which one is illustrated in FIG. 4), and an opaque objects portion 404 containing one or more opaque object records 430 each defining a respective opaque object within the space (of which one is illustrated in FIG. 4).

Header portion 401 includes a space identifier field 405 identifying the space associated with the space map (in the event that the remote visual experience application is used within multiple spaces), a number of reference points field 406 specifying the number of reference points records 410 contained within reference point portion 402, a number of regions field 407 specifying the number of region records 420 contained within region portion 403, and a number of opaque objects field 408 specifying the number of opaque object records contained within opaque objects portion 404. Header portion 401 could include any additional data 409 which might be useful to identify the space, access data within the space map, or otherwise utilize the space map.

Reference point portion 402 contains at least one, and preferably multiple, reference point records 410, each corresponding to a respective reference point used for orientation within the space associated with the space map. A reference point could be any identifiable location within the space. A reference point could be, but is not necessarily, the location of a reference marker 112 which is placed within the space for that purpose. It could alternatively be the location of any identifiable feature within the space. For example, it might be the location of a corner of a room where two walls and a floor meet, a point on a light fixture or plumbing fixture, a point on an article of furniture which generally has a fixed location, and so forth.

The number of reference points may vary. Collectively, the reference points (either alone or in conjunction with other assumed data) define a frame of reference in a coordinate system, such as an x-y-z coordinate system. In general, three points are minimally necessary to define an x-y-z coordinate grid system, although there could be more reference points for greater accuracy. Additionally, there could be fewer than three reference points if direction is known by other means. For example, if the z-axis of an x-y-z coordinate system is assumed perpendicular to a level floor, and a perpendicular direction can be determined by a sensor accessible to the shared visual experience application or by other means, only two reference points would be minimally needed to define the grid system.

Each reference point record 410 contains a reference point identifier field 411 having a unique identifier of the reference point, x-location 412, y-location 413, and z-location 414 fields containing the respective x, y, and z, coordinates of the reference point in the x-y-z coordinate system of the space map, and a reference point signature field 415 containing data enabling the shared visual experience application to recognize the reference point. The signature data could comprise, for example, a digitally recorded image of the reference point and its surrounding area which is matched with a captured video image data from camera to recognize the reference point. It might alternatively or additionally comprise an electronic signature transmitted by a reference marker. It might alternatively or additionally include directional orientation data, for example, that a certain line or feature is parallel to the floor. Signature data could include multiple types of data for recognizing the corresponding reference point.

Region portion 403 contains at least one region record 420, each corresponding to a respective region or sub-region of the space which is the subject of the space map. A region or sub-region defined in region portion 403 is a 3-dimensional portion of the space, having sides which are polygons (or in some cases, plane figures which are unbounded in one or more dimensions), and preferably having a regular shape, such as a rectangular parallelepiped. Because the sides are plane figures, the region is completely defined by the locations of its vertices.

Each region record 420 contains a region identifier field 421 having a unique identifier of the corresponding region, a region type field 422 defining a type of region, and a plurality of vertex x,y,z coordinates 423 (of which four are illustrated in FIG. 4), each identifying the x, y and z coordinate locations of a respective vertex of the region. The region type field defines the shape of the region. For example, a region may be a rectangular parallelepiped, a triangular prism, and so forth. A region type might also include a region which is unbounded in some dimension, in which case some of the specified vertices might define one or more lines which extend in at least one direction to infinity and form respective edges of the region. The number of vertices is determined by the region type field, although it would alternatively be possible to provide a separate field having a number of vertex coordinates 423 in the region record 420. The region record further includes a region description field 424 containing a textual description of the region which can be visually displayed and/or audibly presented to a user.

In one or more embodiments, a user may define a composite region as a union of multiple sub-regions. In such cases, each of multiple region records 420 defines a respective sub-region. Each of the sub-regions of a composite region contains the same region identifier value in region ID field 421. Furthermore, the region type field 422 (or a separate field) is used to indicate that the record is associated with a sub-region of a larger composite region. The use of composite regions enables the user to define region shapes of nearly arbitrary complexity. As a simple example, an L-shaped room may be defined as a single composite region formed from the union of two rectangular parallelepiped sub-regions.

In one or more embodiments, a default region is assumed to exist in the space which is outside any of the regions defined by the space map. The default region need not have a region record 420 defining it, since it is, in effect, defined by the other regions. A special reserved identifier may be used to identify the default regions, or an identifier of the default region may be among the other data 409 contained in header 401.

Opaque objects portion 404 contains at least one opaque object record 430, each corresponding to a respective opaque object in the space which is the subject of the space map. An opaque object defined in opaque objects portion 404 is a 2-dimensional barrier to the field of view of the camera. The purpose of the opaque objects record is to isolate regions from the determined field of view of the camera, and thus a region which lies in the direction of the camera but behind an opaque object is not considered within the field of view of the camera. Typically, an opaque object record represents a wall, floor or ceiling, or portion thereof, in the physical environment. Although it could represent a smaller opaque object, it is not necessary to create an opaque objects record for every opaque object in the space, since the purpose of the record is to determine the limits of the field of view of the camera. For example, a chair or similar object within a room would not normally be the subject of an opaque objects record unless something which could be obscured by the chair or similar object was significant.

Each opaque object record 430 contains an opaque object identifier field 431 having a unique identifier of the corresponding opaque object, an opaque object type field 432 defining a type of opaque object, and a plurality of vertex x,y,z coordinates 433 (of which three are illustrated in FIG. 4), each identifying the x, y and z coordinate locations of a respective vertex of the opaque object. The opaque object type field defines the shape of the opaque object. For example, an opaque object may be a rectangle, a triangle, and so forth. An opaque object type might also include an opaque object which is unbounded in one or more dimensions, in which case some of the specified vertices might define one or more lines which extend in at least one direction to infinity and form respective edges of the opaque object in its plane. The number of vertices is determined by the opaque object type field, although it would alternatively be possible to provide a separate field having a number of vertex coordinates 433 in the opaque object record 430. The opaque object record further includes an opaque object description field 434 containing a textual description of the opaque object which can be visually displayed and/or audibly presented to a user.

In one or more embodiments, a region defined by one or more region records 420 may implicitly include opaque barriers at each boundary surface of the region. The region type filed 422, or some other field, may be used to indicate whether the region includes opaque barriers. In such a case, it would be possible for the remote visual experience application to automatically generate a respective opaque barrier records 430 for each boundary surface of the region having implicit opaque barriers; alternatively, the application could identify such regions during execution and treat all surfaces of such regions as opaque barriers.

In one or more embodiments, an opaque barrier record 430 could include a negative opaque barrier, i.e., an opening or other transparent portion of an otherwise opaque barrier. In such a case the opaque object ID field 431 of the negative opaque barrier is the same as the value of the opaque barrier to which it pertains, and the opaque object type 432 indicates a negative barrier. Such a negative barrier record may be used, for example, to describe doors, windows, or similar openings in otherwise opaque barriers.

In one or more embodiments, a default opaque object is assumed to exist in the space, and this default opaque object need not have an opaque object record 430 defining it. For example, the floor or ground may be an assumed default opaque object. A special reserved identifier may be used to identify the default opaque object, or an identifier of the default opaque object may be among the other data 409 contained in header 401.

Figure 5:
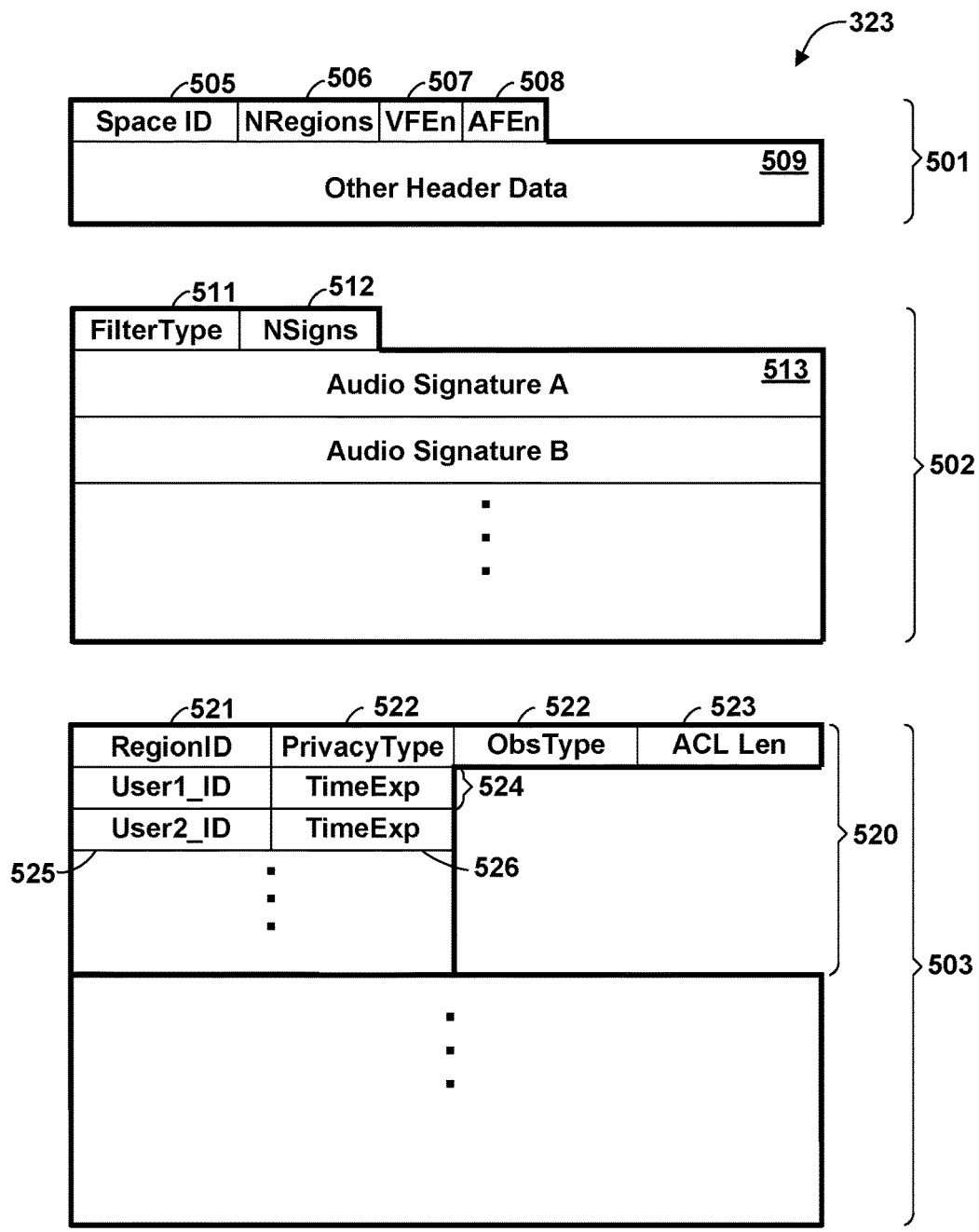
FIG. 5 is a conceptual representation of a profile data structure for supporting a remote visual experience application, according to various embodiments.

FIG. 5 is a conceptual representation of a profile data structure 323 supporting a remote visual experience application, and in particular supporting a virtual vendor house call application, according to various embodiments. Among other things, profile data structure includes data specifying how different regions defined in space map 324 are to be presented to different users. In one or more embodiments, profile data structure 323 further includes parameters of audio filtering.

Referring to FIG. 5, profile 323 includes a header portion 501, an audio filter portion 502 containing parameters of audio filtering, and a region portion 503 containing, for each of a plurality of regions, a respective region record 530 defining how the region is to be visually presented to different users (of which one region record is illustrated in FIG. 5). The profile record could contain additional data not shown.

Header portion 501 includes a space identifier field 505 identifying the space associated with the space map and to which the profile pertains (in the event that the remote visual experience application is used within multiple spaces), a number of regions field 506 specifying the number of region records 520 contained within region portion 503, a video filter enable flag 507 indicating whether filtering of visual images in a video stream is enabled, and a separate audio filter enable flag 508 indicating whether audio filtering of the audio signal portion of the captured video is enabled. Header portion 501 could include any additional data 509 which might be useful to control execution of the remote visual experience application.

Audio filter portion 502 contains an audio filter type field 511 specifying a type of audio filtering to be performed, a number of audio signatures field 512 specifying a number of audio signatures contained in the audio filter portion 502, and a variable number of audio signatures 513.

Audio filtering can be performed in a variety of ways. In one or more embodiments, filtering is performed using noise canceling techniques in which a particular audio source or sources, such as a microphone mounted on a headset, is designated as the audio signal to be transmitted, and ambient audio is to be filtered out, whether it involves a human voice or not. Generally, such techniques require at least one other microphone located remotely from the designated audio signal to be transmitted. Ambient audio detected at this second microphone is filtered from the audio signal, leaving only the audio which is generated very close to the designated microphone, i.e., the voice of the person wearing the headset.

In one or more alternative embodiments, one or more audio signatures are recorded, and the audio signal is filtered either by filtering out voices corresponding to the audio signature(s), or by filtering out everything except voices corresponding to the audio signature(s). In this manner, background conversations of persons not interactively participating in the remote visual experience application can be filtered out.

Region portion 503 contains a region record 520 for each region defined by space map 324 (including the default region). Each region record 520 contains a region identifier field 521 having a unique identifier of the corresponding region, a privacy type field 522 specifying a default privacy attribute of the corresponding region, an obscure function type field 523 specifying how an obscuring function is to be performed, and an access control list length field 524 specifying the number of access control list entries which follow. Each region record may further contain a variable number of access control list entries 525 (of which two are illustrated in FIG. 5), each containing a respective user ID field 526 and time of expiration field 527.

Privacy type field 523 specifies a default privacy attribute for the region, which may be "unrestricted", or "local only", or "authorized only". An "unrestricted" privacy attribute means that visual images of the corresponding region are presented unfiltered to all users; "local only" means that visual images are presented unfiltered only to local users, and are obscured if presented to remote users; "authorized only" means that visual images are presented unfiltered only if the user is authorized by the access control list. The obscure function type field specifies how visual data is obscured if presented to a user not authorized to view it unfiltered. For example, visual images may be completely blocked by presented a monochromatic region, or may be blurred using any of various blurring techniques to obscure detail but not completely block the image.

Each access control list entry 525 contains a user ID field 526 identifying a user to receive unfiltered video images of the corresponding region and a time of expiration field 527, indicating the length of time the user is authorized to receive unfiltered video images. The time of expiration can be 'never' (the user is always authorized to receive unfiltered video), or could be a specific time or a specific event, such as the termination of a current execution instance. The access control list overrides the privacy attribute, i.e., the users identified in the access control list are presented unfiltered video images regardless of the setting of the privacy attribute.

Various software entities are represented conceptually in FIGS. 3-5 as being contained in respective memories of any of the various systems or devices described herein. However, as is well known, the memory of a computer or other digital device is typically insufficient to hold all software entities and other data simultaneously, and selective portions of software entities or other data are typically loaded into memory from storage as required. Furthermore, various software entities are represented in FIGS. 3-5 as being separate entities or contained within other entities. However, it will be understood that this representation is for illustrative purposes only, and that particular modules or data entities could be separate entities, or part of a common module or package of modules. Furthermore, although a certain number and type of software entities are shown in the conceptual representations of FIGS. 3-5, it will be understood that the actual number of such entities may vary, and in particular, that in a remote visual experience environment, the number and complexity of such entities is typically much larger. Additionally, although certain software components are depicted in within respective single systems for completeness of the representation, it is not necessarily true that all programs, functions and data will be present in a single system, and may be present in another partition on the same computer system or in a different computer system. Finally, it will be understood that the conceptual representations of FIGS. 3-5 are not meant to imply any particular memory organizational model, and that a computer system hosting a data streaming application or a database might employ a single address space virtual memory, or might employ multiple virtual address spaces which overlap.

Determination of Camera or Feature Position

In accordance with one or more embodiments, a remote visual experience application is aware of the current position (i.e. location and orientation) of movable camera 103 used for capturing video for the application as the camera changes position. During execution, the remote visual experience application preferably determines current camera position, and continually updates that determination, with respect to the coordinate frame of reference defined by space map 324. Additionally, during an initial phase in which locations of various reference points or other features are determined, relative distances between camera and features may be automatically measured and used to define the locations of features in a three-dimensional frame of reference.

Any of various known techniques used in any of various virtual reality applications or other applications which perform a similar function, in addition to techniques hereafter developed, could be used to determine camera and/or feature position. Such techniques could include, but are not necessarily limited to, optical tracking techniques, inertial tracking techniques, acoustic tracking techniques, magnetic tracking techniques, and/or techniques which involve a combination of sensor input from different types. Optical tracking could involve one or more cameras, which may include the camera capturing the video which is being transmitted as part of the remote visual experience application and/or may include one or more separate cameras used for tracking, which may be in a stationary location physically separate from the camera used for capturing the video which is being transmitted.

In one or more embodiments, one or more reference markers are placed at stationary locations within the space, and camera position is determined with respect to the markers. Camera position may be determined by trilateration or triangulation from detected reference markers. A reference marker could be any identifiable object, but in particular could be a transmitting device which transmits an infra-red signal which is detectable by the camera. A reference marker could alternatively be a passive infra-red device with reflects an infrared signal transmitted by a transmitter in close proximity to the camera, the reflected signal being detectable by the camera. A reference marker could alternatively be some other form of active or passive device which transmits or reflects a detectable transmission, such as an acoustic device. Finally, a reference marker need not have any special electrical, magnetic, acoustic, or other physical properties, but could simply be an object which is readily recognizable by the camera. Although use of some form of reference marker or markers is preferred, it may alternatively be possible to track the position of the camera without reference markers, e.g., by comparing a video image captured by the camera with a known 3D model of the space.

A greater positional accuracy is generally possible with a greater number of markers. For example, if three markers are within the field of vision of the camera, the current position of the camera in three-dimensional space can be determined from the angles made by respective lines between the center of the camera lens and the markers, and the centerline axis of the lens. If fewer markers are visible, position might be estimated by using other data. For example, a distance to a marker or to some other reference, such as a floor or ceiling, can be estimated by other means, such as using an auto-focus capability of the camera. A pair of cameras mounted at a known offset may be used to provide depth measurement capability by stereoscopic vision.

Depending on the technique used to determine the camera's location, it may be desirable to include one or more additional sensors for determining the orientation of the camera in space. For example, a level sensor could be used to determine the orientation of the camera with respect to the ground (i.e, with earth's gravitational field). A magnetic sensor could be used as a compass to determine the orientation of the camera with respect to the earth's magnetic field. Together these two sensor could provide a direction of the camera's lens axis in 3-D space. These could be used in conjunction with other locational data to determine camera position. Additional sensors could be coupled to the camera to provide additional reference data.

Remote Visual Experience Operation

In accordance with one or more embodiments, a space map is constructed which maps the regions of a space within which camera is to operate and capture video images for the remote visual experience. At least one respective privacy attribute is associated with each of multiple regions of the space, the privacy attribute(s) defining, among other things, the ability of one or more remote users to view video images of the corresponding region of the space. The privacy attribute(s) associated with any one space may be independent of privacy attribute(s) associated with any other space.

During execution of a remote visual experience application, video data is captured by the camera, and the location/orientation of the camera is continuously or periodically updated in real time to determine the field of view of the camera, and particularly the region(s) of the space within that field of view. The application refers to the corresponding privacy attribute(s) of those region(s) to determine whether any region(s) should be obscured, and modifies the captured video by obscuring the region(s) accordingly. The modified video is transmitted to the remote user for viewing, e.g., on a display device under control of the remote user.

Figure 6:
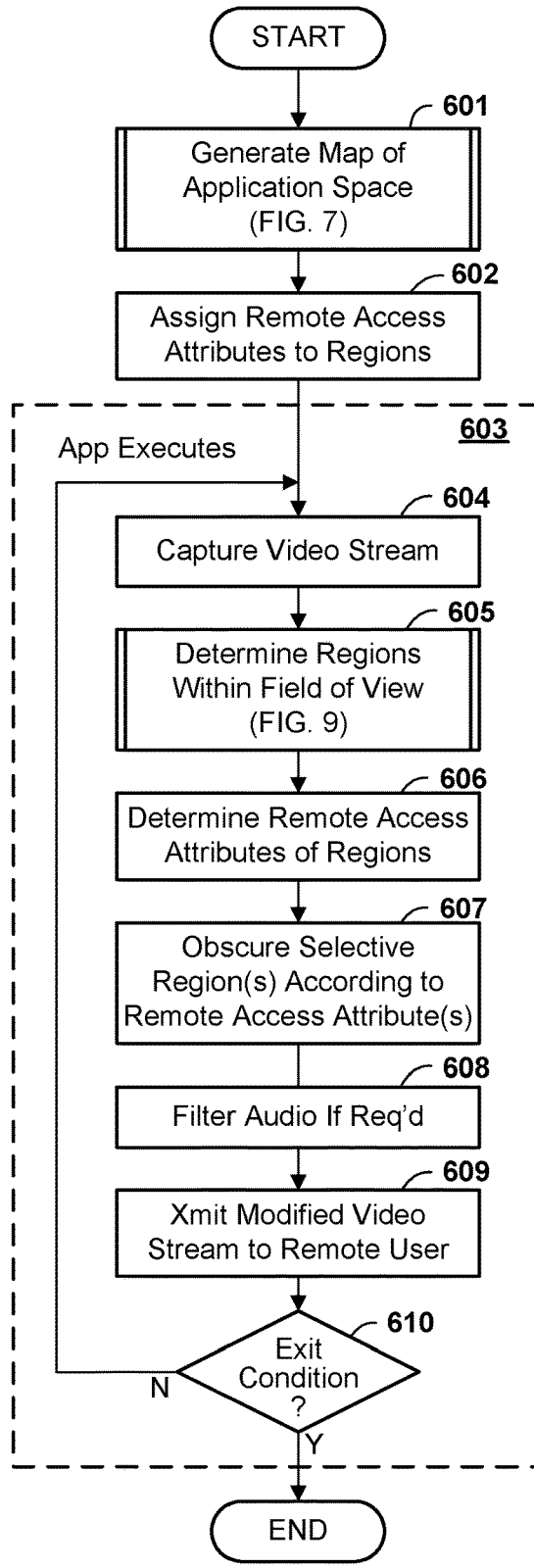
FIG. 6 is a flow diagram illustrating at a high level a process performed by a remote visual experience application, according to various embodiments.

FIG. 6 is a flow diagram illustrating at a high level a process performed by a remote visual experience application, according to various embodiments. Referring to FIG. 6, a map of the space in which the remote visual experience application will operate is generated (block 601). The generation of the space map, represented as block 601 in FIG. 6, and shown in greater detail in FIG. 7, could take place well before an execution instance of the remote visual application, or could occur at about the same time. The space map might even be modified during execution, for example, by expanding the space to include additional regions or to expand the size of an existing region, where the camera is being moved to bring within its field of view space which was not within the original defined space of the space map.

Figure 7:
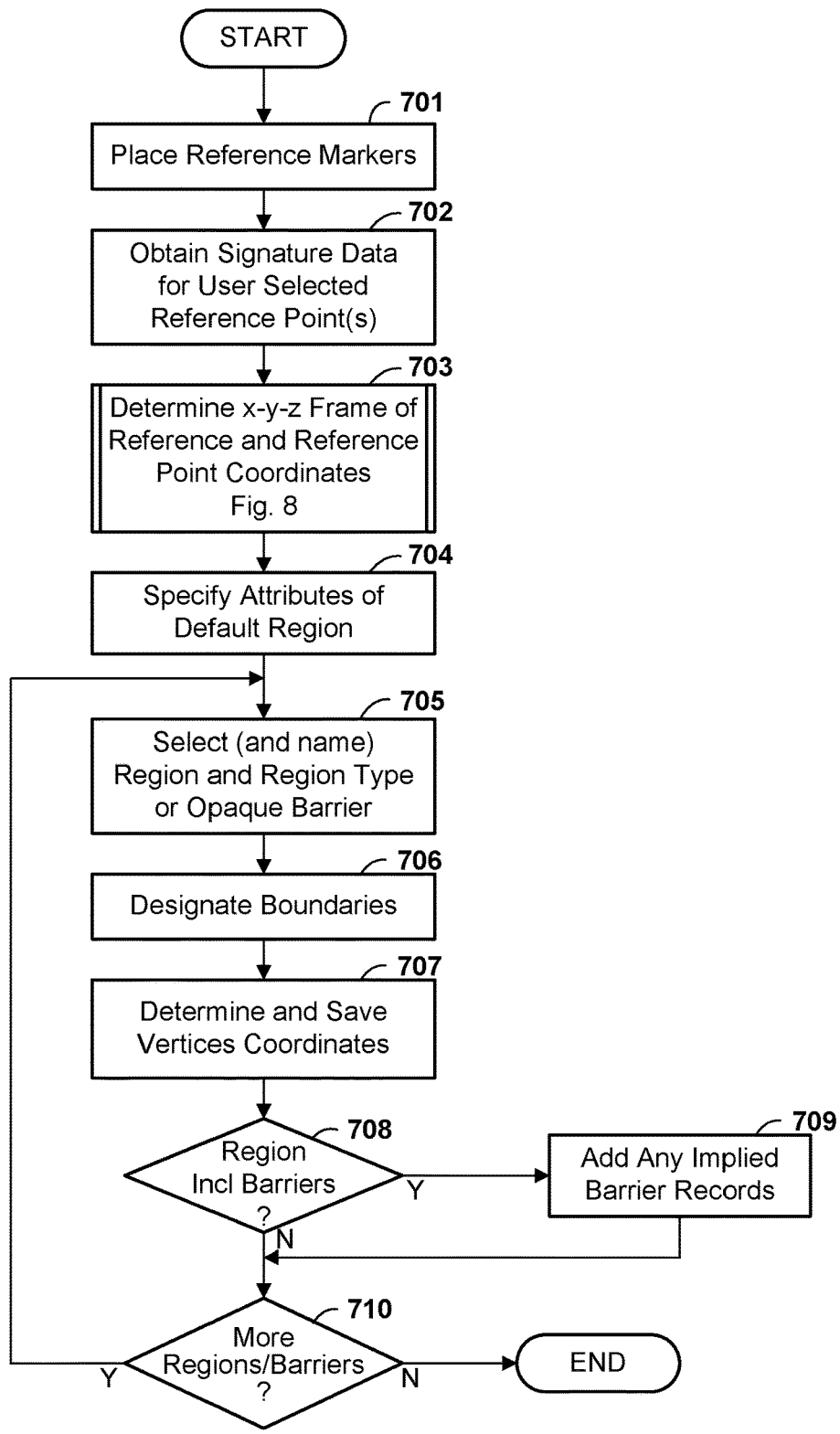
FIG. 7 is a flow diagram illustrating in greater detail a process of generating a space map of the local space within which the remote visual experience operates, according to various embodiments.

In one or more embodiments, a user defines a local space in which video will be captured for the remote visual experience application by establishing at least one, and preferably multiple, reference locations within the space, and by moving the camera to bring the various regions of the space within the field of view of the camera. FIG. 7 is a flow diagram illustrating in greater detail a process of generating space map 324 of the local space within which the remote visual experience operates, according to various embodiments, the process being performed with space map generator 313.

Referring to FIG. 7, a user optionally places one or more reference markers 112 at respective locations within the space, to be used as respective reference points for establishing orientation with the space (block 701). Block 701 is considered an optional step because recognizable fixed features already existing within the space could alternatively be used as reference points.

The user selects at least one, and preferably multiple, reference points, and the camera (and/or sensors associated therewith) obtains respective reference point signature data for each selected reference point in response to the selection (Block 702). The number of reference points selected is preferably at least three, although it is possible to obtain orientation in 3-D space with fewer reference points if additional sensor data is used, such as a gravitational sensor to provide orientation with respect to a ground plane. This signature data is saved in signature data field 415 corresponding to each respective reference point. Selection of a reference point could be accomplished by pointing the camera at the selected reference point, by hand gestures indicating the location of the selected reference point, by voice commands, by moving a cursor to a point on a displayed image via a cursor pointing device, or by other means or combination of means. The signature data is used by the remote visual experience application to recognize the corresponding reference point when appropriate sensor data (which may include image data from the camera) is received as input. Specifically, during execution received sensor data is matched to the signature data which was stored when generating the space map to identify the reference point. The signature data may therefor include anything which would enable recognition of the reference point, and could include sensor data from multiple sources.

The locations of the reference points in relation to one another (and, if necessary, in relation to some other axis or axes of orientation), an x-y-z coordinate frame of reference based on the reference points, and a respective x, y and z coordinate of each reference point in the x-y-z coordinate frame of reference are automatically determined by space map generator 313 and stored in the space map 324 (block 703). These could be determined using any of various techniques. An exemplary technique for determining the coordinate frame of reference and reference point coordinates and certain variations thereof are described below and illustrated in FIG. 8, it being understood that the exemplary techniques and variations described herein are not necessarily the only such techniques which could be used.

Figure 8:
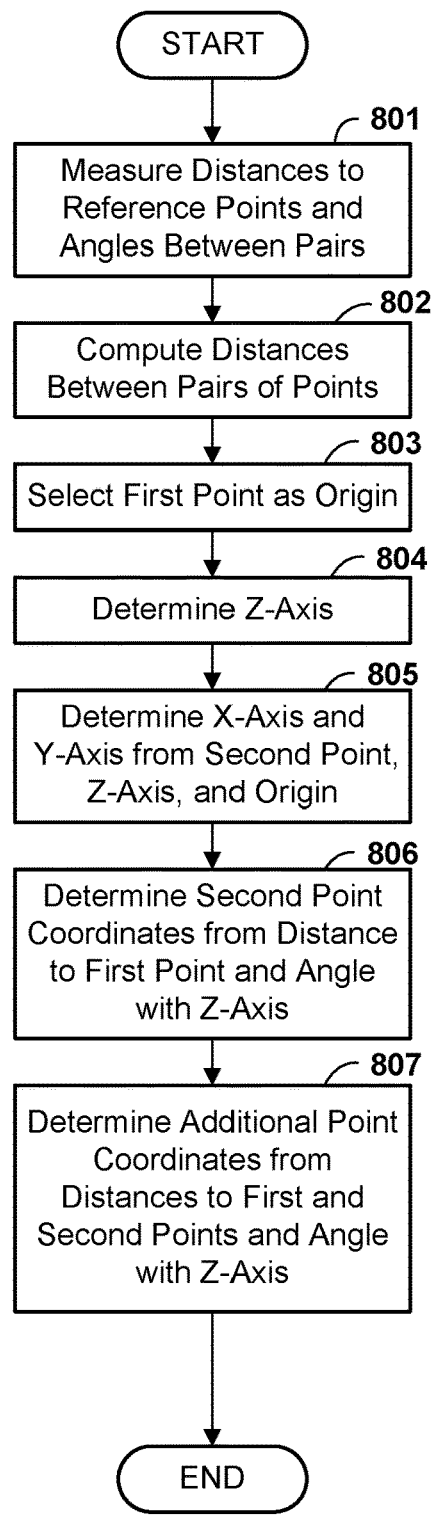
FIG. 8 is a flow diagram illustrating in greater detail a process of determining an x-y-z coordinate frame of reference and coordinates of multiple reference points in that frame of reference, according to various embodiments.

FIG. 8 is a flow diagram illustrating in greater detail a process of determining an x-y-z coordinate frame of reference and coordinates of multiple reference points in that frame of reference, according to various embodiments. In one or more embodiments, the distances between pairs of reference points are determined using sensor distance and angle data. For each of a plurality of pairs of reference points, a respective first distance from a sensing device to a first reference point of the pair is measured, a respective second distance from the sensing device to a second reference point of a pair is measured, and an angle made by a line from the sensing device to the first reference point with a line from the sensing device to the second reference point is determined (block 801). In this instance, the "sensing device" could be the camera, which determines distance using an auto-focus capability to focus separately on the two reference points and determines angle by the projection of the reference points on the captured image. Alternatively, one ore more separate sensors could be used, alone or in cooperation with the camera.

These distances to the two points of each pair and angle form the two sides and adjacent angle of a triangle, from which the length of the opposite side (the distance between the two reference points of the pair) is computed (block 802).

An origin for the x-y-z coordinate frame of reference is selected (block 803). Any convenient point in space may be selected as the origin. In one or more embodiments, one of the reference points is arbitrarily chosen as the origin. An origin might alternatively be selected as the location of a sensor having a fixed location, if such there be.

An orientation of the z-axis (which together with the origin determines the plane of the x and y axes) is selected (block 804). In one or more embodiments, the z-axis orientation is determined using a gravitational or level sensor, the z-axis being parallel to the gravitational force. In the absence of such a sensor, the z-axis might alternatively be determined by reference to a feature having a known vertical orientation.

An x-axis and y-axis orientation is selected (block 805). Having selected an orientation of the z-axis, an orientation of an x-axis can be chosen to coincide with the direction from the origin to a projection of a second arbitrarily chosen reference point onto the plane of the x and y axes, the plane of the x and y axes being a plane containing the origin and perpendicular to the z-axis. The y-axis is then perpendicular to the x-axis in the plane of the x and y axes.

Alternatively, in one or more embodiments, an orientation of the axes may be determined by three arbitrarily selected non-colinear points. In such embodiments, for example, an x-axis is arbitrarily chosen as a line passing through the origin (the first arbitrarily chosen reference point) and a second arbitrarily chosen reference point. An orientation of a y-axis is then chosen by defining a plane of the x-y axes from the x-axis and a third arbitrarily chosen referent point, and defining the y-axis as a line perpendicular to the x-axis and lying in that plane. The z-axis is then a line perpendicular to both x and y axes.

The x, y, and z coordinates of each reference point are determined according to the selected x-y-z coordinate frame of reference, and saved in the corresponding x, y, and z location fields 412, 413, 414 of each reference point record 410 in space map 324. The method used for determining x,y,z coordinates may depend on the frame of reference chosen.

In one or more embodiments, the x,y,z coordinates of the second reference point (used for orienting the x-axis) are determined (block 806). For example, where a gravitational or level sensor is used to determine the z-axis orientation, the angle θ made between a line from the first reference point (origin) to the second reference point with the vertical (z-axis) can be measured with the sensor and camera, and the x and z coordinates of the second reference point derived as d*sin θ and d*cos θ, respectively, where d is the distance between the first two reference points (the y-coordinate of the second reference point being 0).

The coordinates of subsequent reference points are determined by reference to the first and second reference points (block 807), or alternatively, by reference to other reference points the coordinates of which have already been determined. Specifically, from the known distance between the origin (first point) and the subsequent point, and the angle of the line from the origin with the z-axis, a z-coordinate of the subsequent point can be determined in the same manner as the z-coordinate of the second point. A projection of the distance on the x-y plane is similarly computed. The distance between the second point and subsequent point, and differences between their respective z-coordinates, can be used to determine the projection on the x-y plane of the distance between the second and subsequent point. From the two projections and the known x-coordinate of the second point, the three sides of a triangle in the x-y plane are formed, having one vertex at the origin, a second vertex at the projection of the second point on the x-y plane, and a third vertex at the projection of the subsequent point on the x-y plane. From these three distances, the x and y coordinates of the subsequent point can be computed.

Alternatively, if the coordinates of more than three reference points are known, the coordinates of a subsequent referent point can be determined by trilateration from the first three reference points.

As an additional alternative, for example, where three arbitrarily chosen reference points define the coordinate system frame of reference, the first point is the origin, the second point has an x-coordinate equal to the distance between the first two points and y and z coordinates of 0, and the third point (lying in the x-y plane) has a z-coordinate of 0, the x and y coordinates being determined by trilateration from the first two points and the known distances between each and the third. Subsequent reference points can be determined by trilateration from the first three.

Although it is not necessarily required, a greater accuracy in measuring distances between two reference points and angles with vertical using a camera will generally be achieved if the points are more or less equidistant from the camera. The remote visual experience application could optionally instruct the user to move to such a location for each pair of reference points. Alternatively, the application could gather data captured from multiple different camera positions as the user changes camera position by moving about the application space, and select a respective position for each pair of points in which the points are approximately equidistant. Furthermore, any of various techniques could be used whereby measurement data is obtained from multiple camera or other measurement locations and reconciled to obtain a composite measurement.

Although in the embodiments disclosed above the application automatically determines the relevant distances and coordinates of each reference point in an x-y-z coordinate system frame of reference, in one or more alternative embodiments a user could manually input some or all of the measurement or coordinate data, and if the user manually inputs only some of the data, the application could measure and/or derive any missing data needed to define the reference point coordinates.

Referring again to FIG. 7, the user defines one or more regions in the space of space map 324. A region could be any three-dimensional geometric shape defined in the space. In one or more embodiments, a default region includes any part of the space which is not within an explicitly defined region. In one or more embodiments, except for the default region, only a limited number of region shapes are supported, and possibly only one region shape is supported. For example, all regions other than the default region could be rectangular parallelepipeds. In one or more embodiments, a region could be defined as a union of multiple simple shapes, which may overlap, such as multiple rectangular parallelepipeds.

One or more attributes of a default region are specified, either by explicit user input or by default (block 704). These one or more attributes include, in particular, at least one access attribute defining access restrictions upon viewing images of the default region. For example, an access attribute may specify that the corresponding region is freely viewable by all users, local and remote, or may specify that it is viewable only by one or more particular classes of users, or may reference an access control list or other data structure controlling users having access to view the default region. Access attributes could further limit access to a particular time frame, such as access granted only for the duration of an execution instance of the remote visual experience application, or only during certain times of day, or could otherwise limit access.

The user selects a feature to be defined in the space map, such as a region or an opaque barrier, and if applicable designates a type of feature (block 705). The remote visual experience application may support multiple region types and/or multiple opaque barrier types. For example a region type may designate some or all of a region shape, whether the region is by default surrounded by an opaque barrier or not, and/or whether a designated region is a sub-region, i.e., is joined to one or more other designated sub-regions to form a larger composite region in the space map. An opaque barrier type may also include a shape and/or whether the defined shape is a barrier or an opening, the opening being absence of opaqueness in a larger opaque barrier, such as may be formed by a window or door.

The application may automatically assign a region ID or barrier ID for entry in region ID field 421 or barrier ID field 431, as the case may be. If the region is a sub-region to be joined to one or more other designated sub-regions, the application may prompt the user to designate the region to which the sub-region will be joined, as by presenting the user with a list of previously designated regions by a drop-down menu or the like and receiving a user selection. The user may additionally specify a description of the corresponding feature (for entry in region description field 424 or opaque object description field 434, as the case may be).

The user designates the boundaries of the selected feature (block 706). In one or more embodiments, the user uses hand gestures or a combination of hand and voice commands to indicate the corner or edges of a selected feature. A boundary could be coincident with some object present within the application space, such as a wall or article of furniture, or could simply be an arbitrary location in space. In one or more additional embodiments, a user may by voice command or otherwise indicate that an entire room in which the camera is currently positioned is to be a designated region, and pan the camera about the room in such as way as to bring into view all boundary surfaces and edges to enable an identification of the boundaries of the region.

Responsive to each user designated boundary, the remote visual experience application determines the location of the boundary in the coordinate frame of reference, and determines and saves the x-y-z coordinates of the applicable vertices which define the selected feature (block 707). The coordinate locations of boundaries and vertices may be determined using any of the techniques described herein for determining the coordinates of reference points in the coordinate frame of reference. The coordinates of the vertices are saved in vertex coordinate fields 423 or 433 of the space map 324, as the case may be.

If the selected feature is a region of a type that contains an implied opaque barrier at each of its boundaries (the 'Y' branch from block 708), the application automatically generates an opaque barrier record 430 for each boundary surface of the region (block 709). Where the region is a sub-region of a larger composite region, barrier records are only generated for the outer surfaces of the entire region. The application could alternatively use the region record(s) to determine the existence of opaque barriers at run time.

If any more barriers or regions remain to be input, the 'Y' branch is taken from block 710, and a next feature is selected at block 705. When all features have been input, the 'N' branch is taken from block 710, and the generation of the space map is complete.

Where the user is required to input data to the application, such input could be accomplished by any method, now known or hereafter developed, for inputting data to a digital device, and different methods could be used for inputting different data to the application. For example, hand gestures are useful for indicating locations or features in three-dimensional space, and might be used for designating reference points and boundaries of regions or barriers. Other data, such as names of features or access attributes, might be more conveniently input via keyboard, voice commands, pointer selection from a menu, etc. Although particular data input methods may be described herein in connection with certain actions, a remote visual experience application is not necessarily limited to such input methods.

Although in one or more exemplary embodiments a space map of the local space is created by defining one or more reference points and capturing images of the space as described above, a space might alternatively be defined by other means, which may be performed before or during execution of the remote visual experience application. For example, data may be imported and/or converted from a stored digital record mapping the space, such as architectural drawings. Data may even be manually input by a user.

As an additional example of an alternative, a space map may be defined on the fly during execution by capturing video of the space, and defining one or more regions using hand gestures and/or voice commands. In such an alternative embodiment, the entire space may initially be defined as a background region, and one or more additional regions may be defined by the user during execution, each additional region being subtracted from the background region. For example, if a local user wishes to expose only a defined, limited area to view by a remote user, the local user may define the entire space as the background region (and provide a privacy attribute indicating that the background space is not to be exposed to view by the remote user), and during execution create one or more additional regions to be subtracted from the background region, the one or more additional regions having privacy attributes which allow them to be exposed to the remote user. Such a space map could be saved for future re-use, or deleted at the end of the execution instance.

Referring again to FIG. 6, at least one respective privacy attribute which controls viewing access by a remote user is assigned to each region and stored as part of profile data 323 (block 602). A privacy attribute may be assigned by default, or may be assigned by explicit command from the user, which may be voice input, hand gesture, keyboard input, or any of various inputs to digital data devices. The assigning of a privacy attribute to a region would typically be performed concurrently with the definition of the region, but it wouldn't necessarily have to be done at the same time, and could be modified long after the region is defined. The privacy attribute(s) could be as simple as a binary flag indicating whether remote access is permitted, or could be any of a range of values or qualities. Multiple levels of privacy or access by different users could be defined, in which some regions would be unavailable to some remote users but available to others, and some regions might be unavailable to any remote user.

In an exemplary embodiment, a privacy attribute may be implemented as an access control list in which one or more designated users (or classes of users) are authorized to view the video of the corresponding region, each region having a respective independent access control list whereby users are independently authorized to view the video.

In one or more optional embodiments, the user may also specify one or more audio privacy attributes for controlling remote access to the audio signal portion of a video stream, which are also stored in profile data 323. The audio privacy attribute(s) typically would not be specific to a region, but may be used to filter background audio (i.e., audio other than from a particular microphone) or filter voices of specific persons.

Execution of the remote visual experience application is represented in FIG. 6 as the actions occurring within dashed box 603, it being understood, as explained previously, that blocks 601 and/or 602 could also occur at run-time.

A video stream is captured by movable camera 103 and temporarily stored in raw video buffer 325 (block 604).

The regions within the current field of view of camera 103 are periodically or continually determined using orientation function 312 and run-time mapping function 314 (block 605). Determination of the current field of view might be performed at fixed, relatively brief time intervals, or might be performed responsive to input indicating that there has been a significant change in the camera's field of view.

Figure 9:
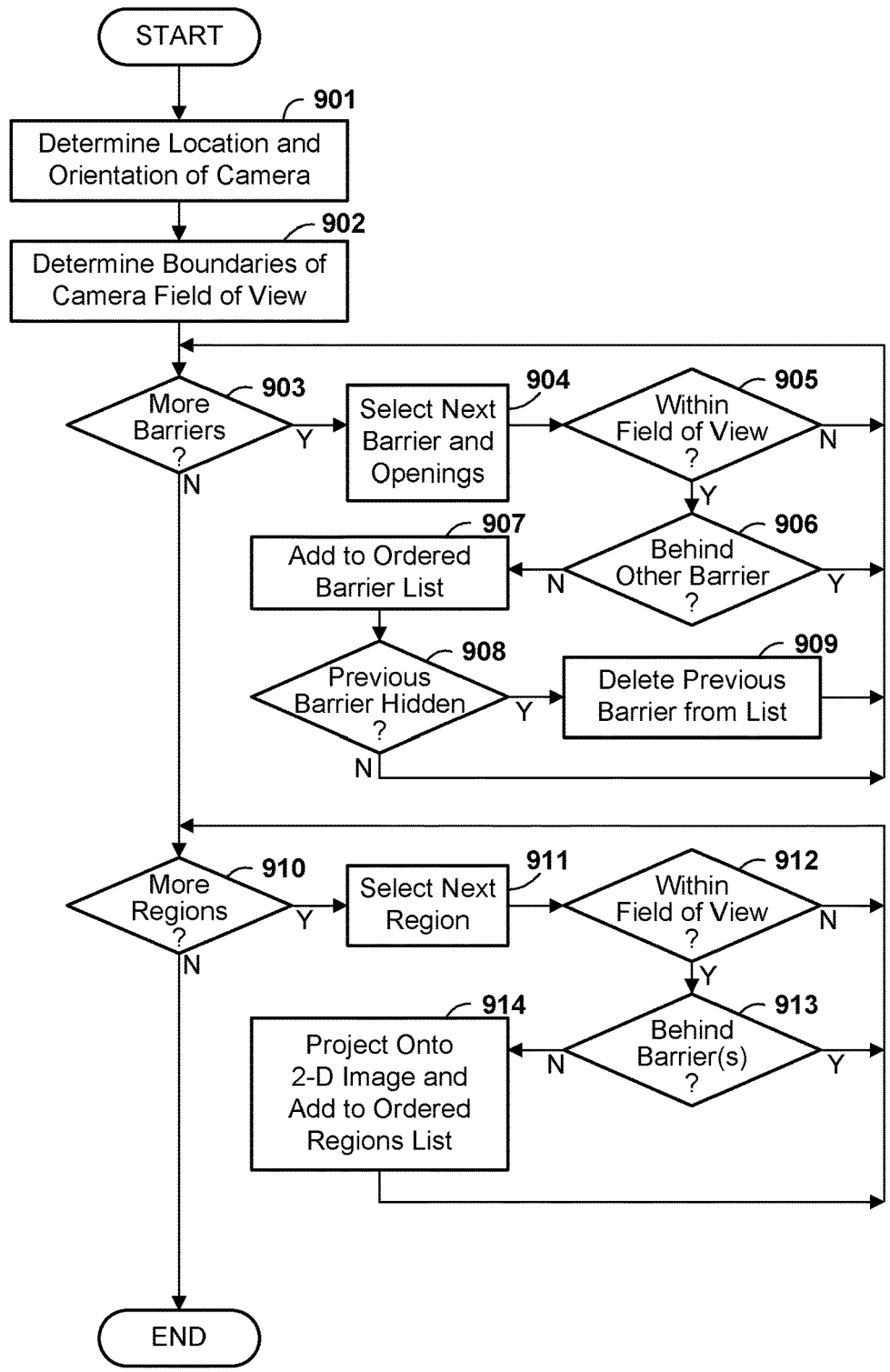
FIG. 9 is a flow diagram illustrating in greater detail a process of determining defined regions of a space which are within the camera's field of view, according to various embodiments.

In one or more embodiments, illustrated in greater detail in FIG. 9, the field of view is determined by determining a camera position within the space (as described previously), and mapping this field of view to the space map to determine regions within the field of view. There could be alternative methods of identifying regions. For example, each region may have its own identifying markers or other reference objects, which might be located on the captured video image, and the region directly mapped from such reference objects.

FIG. 9 is a flow diagram illustrating in greater detail a process of determining defined regions of a space which are within the camera's field of view and are therefore observable on the currently captured video image, according to various embodiments. Referring to FIG. 9, a current location and orientation of the video camera is determined (block 901). The location is the location in the three-dimensional space, defined by the x-y-z coordinates of the camera. The orientation is the direction of the axis of the lens. These are determined by orientation function 312 using any of various techniques as described previously for determining camera position.

Run-time mapping function 314 derives a set of four planes forming the boundaries of the camera's field of view from the camera position (block 902). These four planes converge at a point on the lens axis shortly behind the lens, and intersect with any plane perpendicular to the lens axis to form a rectangle. A three-dimensional polyhedron formed by the four planes and a plane perpendicular to the camera axis is a rectangular pyramid. The three-dimensional region bounded by these four planes is the camera's field of view, and is, at least initially, assumed to extend infinitely into space.

The opaque barrier records are processed in turn to identify any opaque barriers which lie within the boundaries of the four planes described above in block 902 and construct an ordered list of opaque barriers which obscure portions of the field of view, shown as blocks 903-909. If any opaque barrier records remain to be processed, the 'Y' branch is taken from block 903, and a next opaque barrier record is selected, including any openings associated with the selected opaque barrier (block 904).

If the selected opaque barrier lies entirely outside the field of view defined by the four planes, the 'N' branch is taken from block 905 to block 903, to select a next record for processing, if one exists. If the selected opaque barrier is within the field of view, the 'Y' branch is taken from block 905 to block 906. In this case, the run-time mapping function determines whether the opaque barrier is wholly obscured by any previous opaque barrier on the list. If so, the 'Y' branch is taken from block 906 back to block 903 to select a next record for processing, if one exists. If the currently selected opaque barrier is not completely obscured by a previous opaque barrier, the 'N' branch is taken from block 906, and the currently selected opaque barrier is added to the ordered list of opaque barriers at a list location corresponding to its proximity to the camera, barriers closest to the camera being listed first (block 907). The mapping function then determines whether any barriers already on the list which follow the current barrier in the ordering are wholly obscured by the current barrier (block 908). If so, any such obscured barrier is deleted from the list of barriers (block 909). The mapping function then returns to block 903 to select a next barrier if one exists.

When all barrier records have been thus processed, the 'N' branch is taken from block 903 to block 910. Run-time mapping function processes the region records to determine, with respect to each region identified in the space map, whether any portion of the region lies within the field of view of the camera as limited by the barrier records, and determines the boundaries of the projection of each such region onto the two-dimensional video image captured by the camera, shown as blocks 910-914.

If any region records remain to be processed, the 'Y' branch is taken from block 910, and a next region record is selected (block 911). A composite region may require multiple records.

If the selected region lies entirely outside the field of view defined by the four planes, the 'N' branch is taken from block 912 to block 910, to select a next region record for processing, if one exists. If the selected region is within the field of view, the 'Y' branch is taken from block 912 to block 913. In this case, the run-time mapping function determines whether the selected region is wholly obscured by any opaque barrier or barriers on the opaque barrier list. If so, the 'Y' branch is taken from block 913 back to block 910 to select a next record for processing, if one exists. If the currently selected region is not completely obscured by one or more opaque barriers, the 'N' branch is taken from block 913. In this case, the mapping function determines the projection of that portion of the region which is not obscured by any barrier onto the two-dimensional image captured by the video camera, and adds the projection to an ordered list of region projections (block 914). The projections in the list may overlay one another, and are ordered (overlaid) according to the corresponding region's proximity to the camera, the region nearest the camera being on top of the overlaid projections. The mapping function then returns to block 910 to select a next region if one exists.

If a default region is supported, it is selected last because it is defined by space not included in any other region. Once the default region's boundaries are determined, it is processed in a manner similar to any other region by determining whether it is within the field of view, whether it is obscured by one or more barriers, and the projection of the unobscured portion if it exists.

When all regions have been thus processed, the 'N' branch is taken from block 910 and the determination of the projection of visible regions is complete.

Referring again to FIG. 6, the privacy attribute(s) of the region(s) within the field of view of the camera are obtained from stored profile data 323 (block 606). These privacy attributes are compared to the identity or access rights of the current remote user to determine whether it is necessary to obscure the region from view. With respect to any region that the current remote user is not authorized to view, the video is altered to obscure the region from view (block 607). "Obscuring" a region could use any known technique for making optical details difficult or impossible to see. It could amount to replacing the region in the image with a blank blue screen pattern, or it could amount to randomizing some of the pixels to give an "out of focus" effect" or could take some other form to make details within the region difficult or impossible to see. Modified video is temporarily stored in processed video buffer 326.

In one or more embodiments, an audio signal portion of the video data is also filtered in accordance with audio filtering parameters specified in the audio portion 502 of profile data 323 and stored in processed video buffer 326 (block 608). Although this is illustrated in FIG. 6 as an action taking place sequentially after processing of the video images, it will be understood that audio processing and video image processing could be performed concurrently. In one or more alternative embodiments, no audio filtering is performed.

The modified video from the processed video buffer 326 (including accompanying audio signal, if any) is transmitted over network 106 to a remote 107 for display in real time to the remote user (block 609). If an exit condition is not present, the process continues (the 'N' branch from block 610). If an exit condition, such as a command to terminate the application, is present, the process ends, indicated by the 'Y' branch from block 610.

ADVANTAGES

Although shared visual experience applications are very recent developments, it can be expected that many more such applications will be developed in the future. Such future applications may venture far beyond the simple example given above. Shared visual experience applications may be useful for teaching, health care, entertainment, marketing, building and equipment maintenance, construction, law enforcement, and many others.

In the earlier teleconferencing environment, it was common to provide a secure space for the camera's field of vision, and to exclude from that space anything that should not be exhibited to the remote user. However, in a shared visual experience application, it is much more difficult to control what might be visible to the remote user. The local user might, inadvertently or at the direction of the remote user, move the camera's field of vision to include objects which should not be seen by the remote user. For example, a local user inside his own home might reveal sensitive documents, details of the home's layout or valuables contained therein, persons in embarrassing or personal situations, children, and so forth.

Advantages of certain embodiments include improved techniques which protect the privacy of persons when video data is transmitted in real time for display to a remote recipient, and in particular, when video data is transmitted by a shared visual experience application to a remote user.

A system which obscures video images of selective regions of a three-dimensional space as described herein provides a relatively more secure and foolproof protection from inadvertent disclosure of sensitive, private or confidential matters. A user need not think of all possible sensitive matter within the space, and may broadly exclude selective regions from remote viewing simply because the regions have nothing relevant to the purpose of the remote visual experience application. For example, in the case of a virtual vendor house call application, the user can narrowly define the region relevant to the subject of the virtual vendor house call, such as repair of a particular fixture, and obscure all other regions of the space without the need to consider specific content needed protection in the other regions. Furthermore, by determining regions within the three-dimensional space that are within a field of view of the movable camera, protection of matter in a private region is maintained as the camera is moved, regardless of the position and orientation of the camera.

OTHER VARIATIONS

Although a series of steps has been described above as one or more preferred and/or alternate embodiments, it will be appreciated that many variations of processes for a remote visual experience are possible. In particular, some steps may be performed in a different order, different data structures may be used, and/or different hardware or software resources may be employed to perform functions described herein. Furthermore, although certain formulae, thresholds, logical conditions, and so forth may have been disclosed as one or more embodiments, it will be appreciated that these formulae, thresholds, logical conditions, etc., and variations thereof are only some of the possible embodiments, and that other techniques could alternatively be used.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. Examples of a computer readable storage medium are illustrated in FIG. 2 as system memory 202 and data storage devices 221-223. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Unless inconsistent with the invention or otherwise qualified herein, computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although a specific embodiment of the invention has been disclosed along with certain alternatives, it will be recognized by those skilled in the art that additional variations in form and detail may be made within the scope of the following claims:

What is claimed is:

1. A non-transitory computer-readable media having recorded thereon a computer program having a plurality of computer-executable instructions, wherein the computer program, when executed by at least one computer system, causes the at least one computer system to perform actions comprising:

receiving input identifying a plurality of regions within a three-dimensional space, and for each region of said plurality of regions, at least one respective remote access attribute obtaining video of at least a part of the space from a movable camera, the video being obtained for a remote visual experience application;

determining regions within the three-dimensional space that are within a field of view of the movable camera, wherein said determining regions within the three-dimensional space that are within the field of vision of the movable camera comprises: (a) receiving a respective signal from each of one or more reference markers, (b) determining a location and orientation of the movable camera using the respective signal from each of one or more reference markers, and (c) using the determined location and orientation of the movable camera to determine regions within the three dimensional space that are within the field of vision of the movable camera;

for each region of said plurality of regions which is captured in the video obtained from the movable camera, using the at least one respective remote access attribute of the respective region to modify the video by obscuring video images within a first region of said plurality of regions which is captured in the video while not obscuring images within a second region of said plurality of regions which is captured in the video; and providing the modified video for display in real time to at least one remote user of the remote visual experience application.

2. The non-transitory computer-readable media of claim 1, wherein said camera is mounted to a wearable appliance of a local user.

3. The non-transitory computer-readable media of claim 1, wherein said remote visual experience application is a virtual vendor house call application.

4. The non-transitory computer-readable media of claim 1, wherein the computer program, when executed by the at least one computer system, further causes the at least one computer system to perform actions comprising:

generating a space map of at least a portion of said three-dimensional space, said space map defining a coordinate frame of reference with respect to at least one reference point, and identifying said plurality of regions in said coordinate frame of reference.

5. The non-transitory computer-readable media of claim 4, wherein said plurality of regions include at least one region having boundaries explicitly defined in said space map and a default region, said default region being that portion of said three-dimensional space lying outside any of the at least one region having boundaries explicitly defined in said space map.

6. The non-transitory computer-readable media of claim 4, wherein generating a space map of at least a portion of said three dimensional space comprises:

receiving user input designating a plurality of reference points;

using the plurality of reference points to select an origin and orientation in a coordinate frame of reference;

determining respective coordinates of each reference point of the plurality of reference points in the coordinate frame of reference;

determining respective coordinates associated with at least one region of the plurality of regions in the coordinate frame of reference.

7. The non-transitory computer-readable media of claim 1, wherein the computer program, when executed by at least one computer system, further causes the at least one computer system to perform actions comprising filtering an audio signal accompanying said video according to at least one pre-specified audio filtering parameter.

8. A data processing apparatus supporting execution of a remote visual experience application, comprising:

at least one physical processor;

at least one physical memory;

a remote visual experience application embodied as instructions executable on the at least one processor and storable in the at least one memory, the remote visual experience application implementing selective obscuring of portions of visual images presented to at least one remote user using a data structure identifying a plurality of regions within a three-dimensional space, and for each region of said plurality of regions, at least one respective remote access attribute;

wherein the remote visual experience application receives video of at least a part of the space from a movable camera;

wherein the remote visual experience application determines regions within the three-dimensional space that are within a field of view of the movable camera by: (a) receiving a respective signal from each of one or more reference markers, (b) determining a location and orientation of the movable camera using the respective signal from each of one or more reference markers, and (c) using the determined location and orientation of the movable camera to determine regions within the three dimensional space that are within the field of vision of the movable camera;

wherein the remote visual experience application further, for each region of said plurality of regions which is captured in the video received from the movable camera, uses the at least one respective remote access attribute of the respective region to modify the video by obscuring video images within a first region of said plurality of regions which is captured in the video while not obscuring images within a second region of said plurality of regions which is captured in the video; and wherein the remote visual experience application further provides the modified video for display in real time to at least one remote user of the remote visual experience application.

9. The data processing apparatus of claim 8, wherein said remote visual experience application includes a space map generating function which generates a space map of at least a portion of the three-dimensional space, said space map defining a coordinate frame of reference with respect to at least one reference point, and identifying said plurality of regions in said coordinate frame of reference.

10. The data processing apparatus of claim 9, wherein said plurality of regions include at least one region having boundaries explicitly defined in said space map and a default region, said default region being that portion of said three-dimensional space lying outside any of the at least one region having boundaries explicitly defined in said space map.

11. The data processing apparatus of claim 9, wherein the space map generating function generates a space map of at least a portion of the three dimensional space by:
- receiving user input designating a plurality of reference points;
- using the plurality of reference points to select an origin and orientation in a coordinate frame of reference;
- determining respective coordinates of each reference point of the plurality of reference points in the coordinate frame of reference;
- determining respective coordinates associated with at least one region of the plurality of regions in the coordinate frame of reference.

12. The data processing apparatus of claim 8, wherein said camera is mounted to a wearable appliance of a local user.

13. The data processing apparatus of claim 8, wherein said remote visual experience application is a virtual vendor house call application.

14. The data processing apparatus of claim 8, wherein the remote visual experience application further filters an audio signal accompanying said video according to at least one pre-specified audio filtering parameter.

\* \* \* \* \*